US011215065B2

(12) United States Patent
Starr et al.

(10) Patent No.: US 11,215,065 B2
(45) Date of Patent: Jan. 4, 2022

(54) TURBINE SHROUD ASSEMBLY WITH CERAMIC MATRIX COMPOSITE COMPONENTS HAVING STRESS-REDUCED PIN ATTACHMENT

(71) Applicants: Rolls-Royce Corporation, Indianapolis, IN (US); Rolls-Royce North American Technologies Inc., Indianapolis, IN (US)

(72) Inventors: Shaling H. Starr, McCordsville, IN (US); Aaron D. Sippel, Zionsville, IN (US); Ted J. Freeman, Danville, IN (US); David J. Thomas, Brownsburg, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 4 days.

(21) Appl. No.: 16/857,988

(22) Filed: Apr. 24, 2020

(65) Prior Publication Data
US 2021/0332714 A1 Oct. 28, 2021

(51) Int. Cl.
*F01D 11/08* (2006.01)
*F01D 25/24* (2006.01)

(52) U.S. Cl.
CPC .......... *F01D 11/08* (2013.01); *F01D 25/246* (2013.01); *F05D 2220/323* (2013.01); *F05D 2230/60* (2013.01); *F05D 2240/11* (2013.01); *F05D 2250/75* (2013.01); *F05D 2260/30* (2013.01); *F05D 2300/10* (2013.01); *F05D 2300/6033* (2013.01)

(58) Field of Classification Search
CPC ........ F01D 11/08; F01D 11/005; F01D 25/24; F01D 25/246; F05D 2240/11; F05D 2300/6033; F16B 35/041; F16B 33/006; F16B 25/0094
See application file for complete search history.

(56) References Cited

U.S. PATENT DOCUMENTS

| | | |
|---|---|---|
| 5,368,444 A | 11/1994 | Anderson |
| 6,877,952 B2 | 4/2005 | Wilson |
| 6,884,026 B2 | 4/2005 | Glynn et al. |
| 7,153,054 B2* | 12/2006 | Arbona ................. F16B 5/0241 403/28 |
| 7,416,362 B2 | 8/2008 | North |
| 7,563,071 B2 | 7/2009 | Campbell et al. |
| 7,874,059 B2 | 1/2011 | Morrison et al. |
| 9,863,265 B2 | 1/2018 | Stapleton et al. |
| 10,145,252 B2* | 12/2018 | Kirby .................... C04B 35/565 |
| 10,301,960 B2 | 5/2019 | Stapleton et al. |
| 10,378,386 B2 | 8/2019 | Roussille et al. |

(Continued)

*Primary Examiner* — Woody A Lee, Jr.
*Assistant Examiner* — Maxime M Adjagbe
(74) *Attorney, Agent, or Firm* — Barnes & Thornburg LLP

(57) ABSTRACT

A turbine shroud assembly is adapted to extend around a turbine wheel mounted for rotation about a central reference axis of a gas turbine engine. The turbine shroud assembly includes a carrier segment made from metallic materials and a blade track segment made from ceramic matrix composite materials. The carrier extends at least partway about the axis. The blade track segment is supported by the carrier radially relative to the axis to define a portion of a gas path of the assembly.

20 Claims, 3 Drawing Sheets

(56) References Cited

U.S. PATENT DOCUMENTS

| | | | |
|---|---|---|---|
| 2016/0376921 A1* | 12/2016 | O'Leary | F01D 25/12 |
| | | | 415/116 |
| 2018/0051591 A1 | 2/2018 | Quennehen et al. | |
| 2018/0073398 A1 | 3/2018 | Quennehen et al. | |
| 2021/0047936 A1 | 2/2021 | McCaffrey | |

* cited by examiner

TURBINE SHROUD ASSEMBLY WITH CERAMIC MATRIX COMPOSITE COMPONENTS HAVING STRESS-REDUCED PIN ATTACHMENT

FIELD OF THE DISCLOSURE

The present disclosure relates generally to gas turbine engines, and more specifically to turbine shrouds and other assemblies included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials with high temperature tolerance, such as ceramic matrix composites (CMC). Integration of CMC's with metallic components with an assembly remains an area of interest.

SUMMARY

The present disclosure may comprise one or more of the following features and combinations thereof.

A turbine shroud assembly may be adapted to extend around a turbine wheel mounted for rotation about a central reference axis. The turbine shroud assembly may include a carrier segment, a blade track segment, and a mount pin. The carrier segment may be made from metallic materials. The blade track segment may be made from ceramic matrix composite materials. The mount pin may extend from the carrier segment through the blade track segment to couple the blade track segment to the carrier segment.

In some embodiments, the blade track segment may be shaped to include a runner, a first attachment flange, and a second attachment flange. The runner may face radially inward toward the central reference axis. The first attachment flange may extend radially outward from the runner. The second attachment flange may extend radially outward from the runner at a location spaced axially from the first attachment flange.

In some embodiments, the second attachment flange may be spaced apart axially from the first attachment flange to establish a confronting face and an opposing face. The confronting face may face toward the first attachment flange. The opposing face may face away from the first attachment flange.

In some embodiments, the mount pin may extend from the carrier segment through a first pin passage and a second pin passage formed in the blade track segment to couple the blade track segment to the carrier segment. The first pin passage may be formed through the first attachment flange. The second pin passage may be formed through the second attachment flange.

In some embodiments, one of the confronting face and the opposing face of the second attachment flange may be formed to include a countersink. The countersink may be formed in the second attachment flange around the second pin passage. The countersink may be configured to reduce stress induced in the blade track segment by bending of the mount pin upon loading of the blade track segment radially inward during use of the turbine shroud assembly in the gas turbine engine.

In some embodiments, the opposing face of the second attachment flange may be formed to include the countersink. The countersink may be formed in the opposing face of the second attachment flange around the second pin passage.

In some embodiments, the first attachment flange may have a confronting face and an opposing face. The confronting face may face toward the second attachment flange. The opposing face may face away from the second attachment flange.

In some embodiments, one of the confronting face and the opposing face of the first attachment flange may be formed to include a countersink. The countersink may be formed in the first attachment flange around the first pin passage.

In some embodiments, the opposing face of the first attachment flange may be formed to include the countersink. The countersink may be formed in the opposing face of the first attachment flange around the first pin passage.

In some embodiments, the carrier segment may include a first carrier flange and a second carrier flange. The first carrier flange may be arranged adjacent to the first attachment flange of the blade track segment. The second carrier flange may be arranged adjacent to the second attachment flange of the blade track segment.

In some embodiments, each countersink may be formed in the opposing face of the respective attachment flange of the blade track segment. In some embodiments, the mount pin may extend at least partway into the first carrier flange and into the second carrier flange.

In some embodiments, the first carrier flange may be located axially forward of the first attachment flange of the blade track segment and the second carrier flange may be located axially aft of the second attachment flange of the blade track segment. The first and second carrier flanges may be located axially forward and aft of the respective attachment flanges so that both the first attachment flange and the second attachment flange are located axially between the first carrier flange and the second carrier flange.

In some embodiments, the carrier segment may include a carrier flange. The carrier flange may be arranged axially between the first attachment flange and the second attachment flange of the blade track segment.

In some embodiments, each countersink may be formed in the confronting face of the respective attachment flange of the blade track segment. The mount pin may extend through the first attachment flange of the blade track segment, the carrier flange of the carrier segment, and the second attachment flange of the blade track segment.

According to another aspect of the present disclosure, an assembly adapted for use in a gas turbine engine may include a carrier component, a heat shield component, and a mount pin. The carrier component may be made from metallic materials and may be arranged to extend at least partway around a central reference axis. The heat shield component may made from ceramic matrix composite materials. The mount pin may extend from the carrier component through the heat shield component to couple the heat shield component to the carrier component.

In some embodiments, the heat shield component may be shaped to include a shield panel, a first attachment flange, and a second attachment flange. The shield panel may be configured to face a primary gas path of the gas turbine engine. The first attachment flange may extend radially from the shield panel. The second attachment flange may extend radially from the shield panel at a location spaced axially from the first attachment flange.

In some embodiments, the second attachment flange may be spaced apart axially from the first attachment flange to establish a confronting face and an opposing face. The confronting face may face toward the first attachment flange. The opposing face may face away from the first attachment flange.

In some embodiments, the mount pin may extend from the carrier component through a first pin passage and a second pin passage formed in the heat shield component to couple the heat shield component to the carrier component. The first pin passage may be formed through the first attachment flange of the heat shield component. The second pin passage may be formed through the second attachment flange of the heat shield component.

In some embodiments, one of the confronting face and the opposing face of the second attachment flange may be formed to include a countersink. The countersink may be formed in the second attachment flange around the second pin passage. The countersink may be configured to reduce stress induced in the heat shield component by bending of the mount pin upon loading of the heat shield component radially away from the carrier component.

In some embodiments, the opposing face of the second attachment flange may be formed to include the countersink. The countersink may be formed in the opposing face of the second attachment flange around the second pin passage.

In some embodiments, the first attachment flange may have a confronting face and an opposing face. The confronting face may face toward the second attachment flange. The opposing face may face away from the second attachment flange.

In some embodiments, one of the confronting face and the opposing face of the first attachment flange may be formed to include a countersink. The countersink may be formed in the first attachment flange around the first pin passage. The countersink may be configured to reduce stress induced in the heat shield component by bending of the mount pin upon loading of the heat shield component radially away from the carrier component.

In some embodiments, the opposing face of the first attachment flange may be formed to include the countersink. The countersink may be formed in the opposing face of the first attachment flange around the first pin passage.

In some embodiments, the carrier component may include a first carrier flange and a second carrier flange. The first carrier flange may be arranged adjacent to the first attachment flange of the heat shield component. The second carrier flange may be arranged adjacent to the second attachment flange of the heat shield component.

In some embodiments, each countersink may be formed in the opposing face of the respective attachment flange of the heat shield component. In some embodiments, the mount pin may extend at least partway into the first carrier flange and the second carrier flange.

In some embodiments, the first carrier flange may be located axially forward of the first attachment flange of the heat shield component and the second carrier flange may be located axially aft of the second attachment flange of the heat shield component. The first and second carrier flanges may be located axially forward and aft of the respective attachment flanges so that both the first attachment flange and the second attachment flange are located axially between the first carrier flange and the second carrier flange.

In some embodiments, the carrier component may include a carrier flange. The carrier flange may be arranged axially between the first attachment flange and the second attachment flange of the heat shield component.

In some embodiments, each countersink may be formed in the confronting face of the respective attachment flange. The mount pin may extend through the first attachment flange of the heat shield component, the carrier flange of the carrier component, and the second attachment flange of the heat shield component.

These and other features of the present disclosure will become more apparent from the following description of the illustrative embodiments.

DETAILED DESCRIPTION OF THE DRAWINGS

Figure 1:
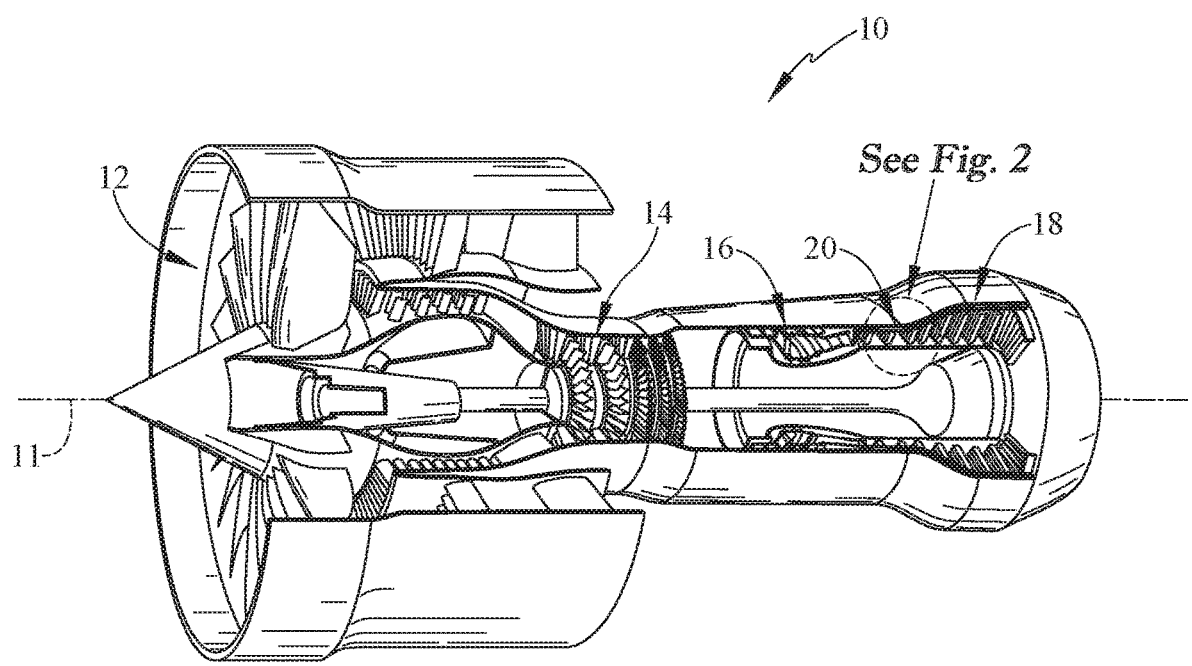
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

Figure 2:
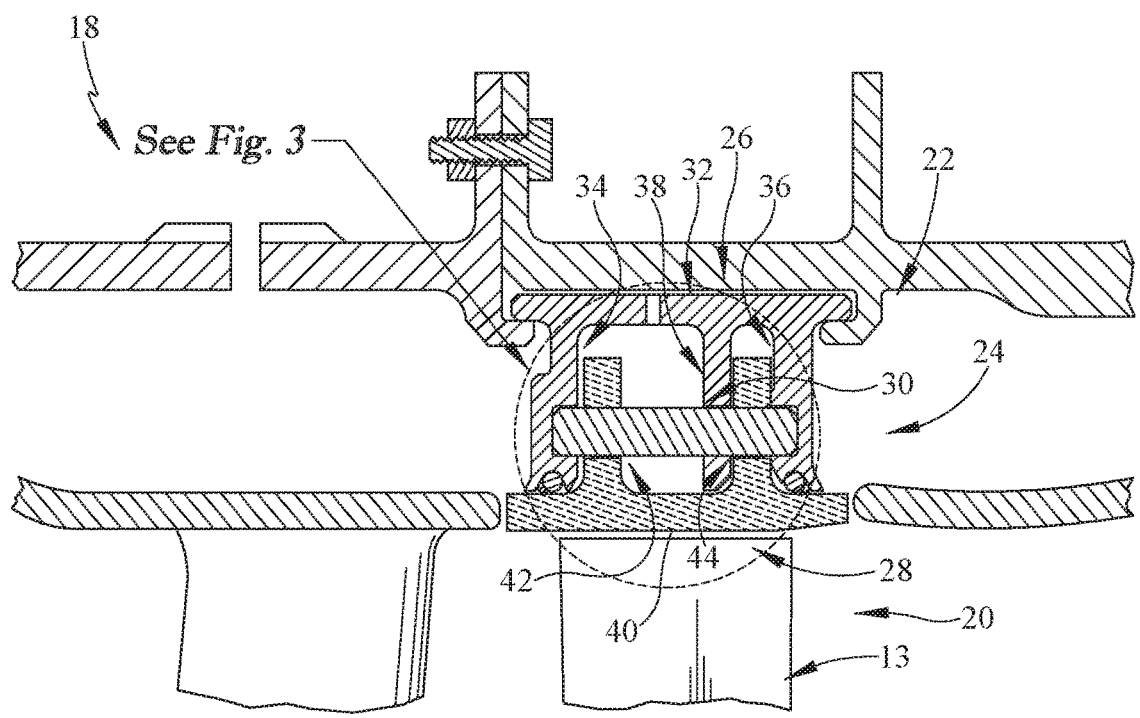
FIG. 2 is a cross-sectional view of a turbine shroud assembly included in the turbine from in FIG. 1 showing that the turbine shroud segment includes a carrier, a blade track segment made from ceramic matrix composite materials, and a mount pin configured to couple the blade track segment with the carrier.

An illustrative turbine shroud assembly 22 adapted for use in a gas turbine engine 10 is shown in FIGS. 1 and 2. The illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction are directed into the turbine 18 to cause the turbine 18 to rotate about a central reference axis 11 and drive the compressor 14 and the fan 12.

The turbine 18 includes at least one turbine wheel assembly 20 and the turbine shroud assembly 22 positioned to surround the turbine wheel assembly 20 as shown in FIGS. 1 and 2. The turbine shroud assembly 22 is coupled to an outer case 15 of the gas turbine engine 10. The turbine wheel assembly 20 includes a plurality of blades 13 coupled to a rotor disk for rotation therewith. The hot, high pressure combustion products from the combustor 16 are directed toward the blades 13 of the turbine wheel assemblies 20 along a flow path 17. The blades 13 are in turn pushed by the combustion products to cause the turbine wheel assembly 20 to rotate; thereby, driving the rotating components of the compressor 14 and/or the fan 12.

Figure 3:
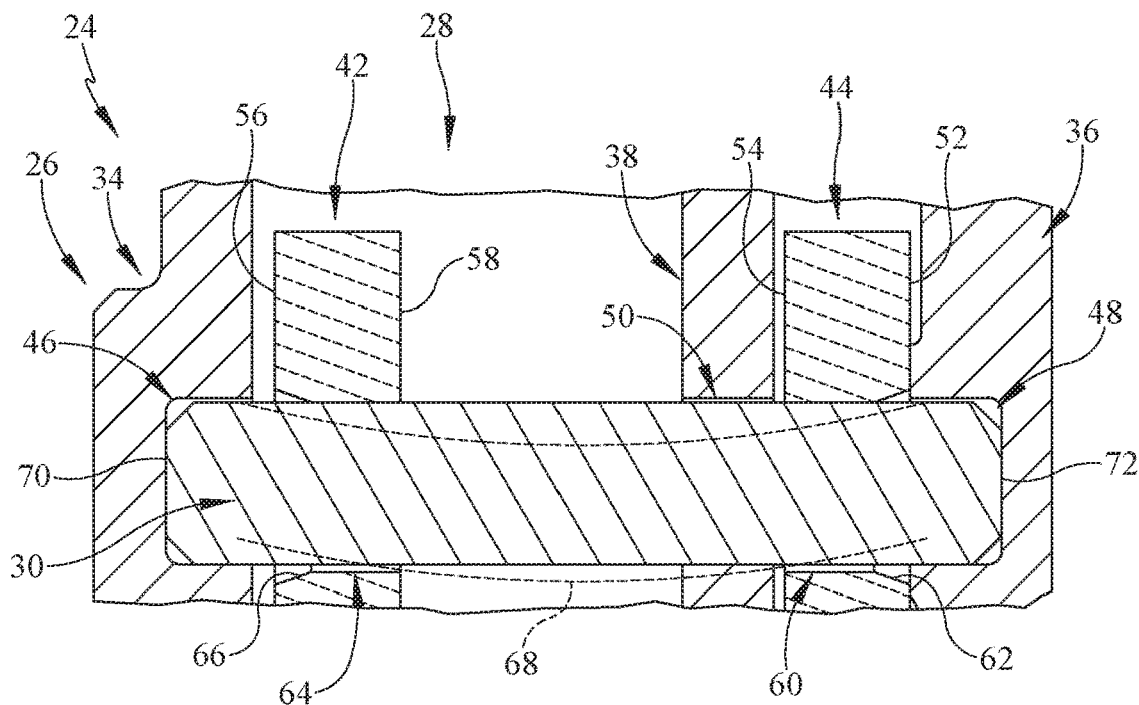
FIG. 3 is an enlarged sectional view of a portion of the turbine shroud assembly from FIG. 2 showing that the blade track segment includes attachment flanges that extends radially outward to the carrier and the mount pin extends from the carrier through a first pin passage formed through the first attachment flange and a second pin passage formed through the second attachment flange to couple the blade track segment to the carrier.

The turbine shroud assembly 22 extends around the turbine wheel assembly 20 to block combustion products from passing over the blades 13 without pushing the blades 13 to rotate as suggested in FIG. 2. In the illustrative embodiment, the turbine shroud assembly 22 is made up of a number of shroud segments 24, one of which is shown in FIGS. 2 and 3, that extend only partway around the central axis 11 and cooperate to surround the turbine wheel assembly 20. The shroud segments 24 are sealed against one another, such as by strip seal members, to provide a continuous turbine shroud assembly 22. In other embodiments, the turbine shroud assembly 22 is annular and non-segmented to extend fully around the central axis 11 and surround the turbine wheel assembly 20. In yet other embodiments, certain components of the turbine shroud assembly 22 are segmented while other components are annular and non-segmented.

Each shroud segment 24 includes a carrier 26, a blade track segment 28, and a mount pin 30 as shown in FIGS. 2 and 3. The carrier 26 is a metallic component mounted in engine 10 and is configured to support the blade track segment 28 in position adjacent to the blades 13 of the turbine wheel assembly 20. The blade track segment 28 illustratively comprises ceramic-matrix composite materials and is adapted to withstand high temperatures. The blade track segment 28 directly faces the blades 13 and interfaces with high temperature gasses in the flow path 17. There could be more than one blade track segment 28 per carrier 26 in other embodiments. The mount pin 30 is configured to couple the blade track segment 28 to the carrier 26 to position the blade track segment 28 in a predetermined location relative to the blades 13.

The carrier 26 extends circumferentially at least partway around the central axis 11 and includes a support panel 32 and at least one support flange 36 as shown in FIG. 2. The support panel 32 extends axially relative to the central axis 11 and is coupled to the turbine case 15. The support flange 36 extends inwardly from the support panel toward the central axis 11. The support flange 36 is formed to include a pin-receiving aperture 48 that extends axially through the support flange 36 as shown in FIGS. 2 and 3. The carrier 26 may have other support flanges 34, 38 that also extend inwardly from the support panel 32 and engage the mount pin 30.

The blade track segment 28 is positioned directly inward from the carrier 26 and includes a runner 40 and at least one attachment flange 44 as shown in FIG. 2. The runner 40 provides a radially outer boundary for flow path 17 and faces the central axis 11 to define a portion of a primary gas path of the gas turbine engine 10. The attachment flange 44 extends radially outward away from the runner 40 toward the support panel 32. The attachment flange 44 is aligned with the support flange 34 of the carrier 26 and is formed to include a pin passage 60 that extends through the attachment flange 44. The pin passage 60 is aligned with the pin-receiving aperture 48 formed in the support flange 36 of the carrier 26.

Figure 4:
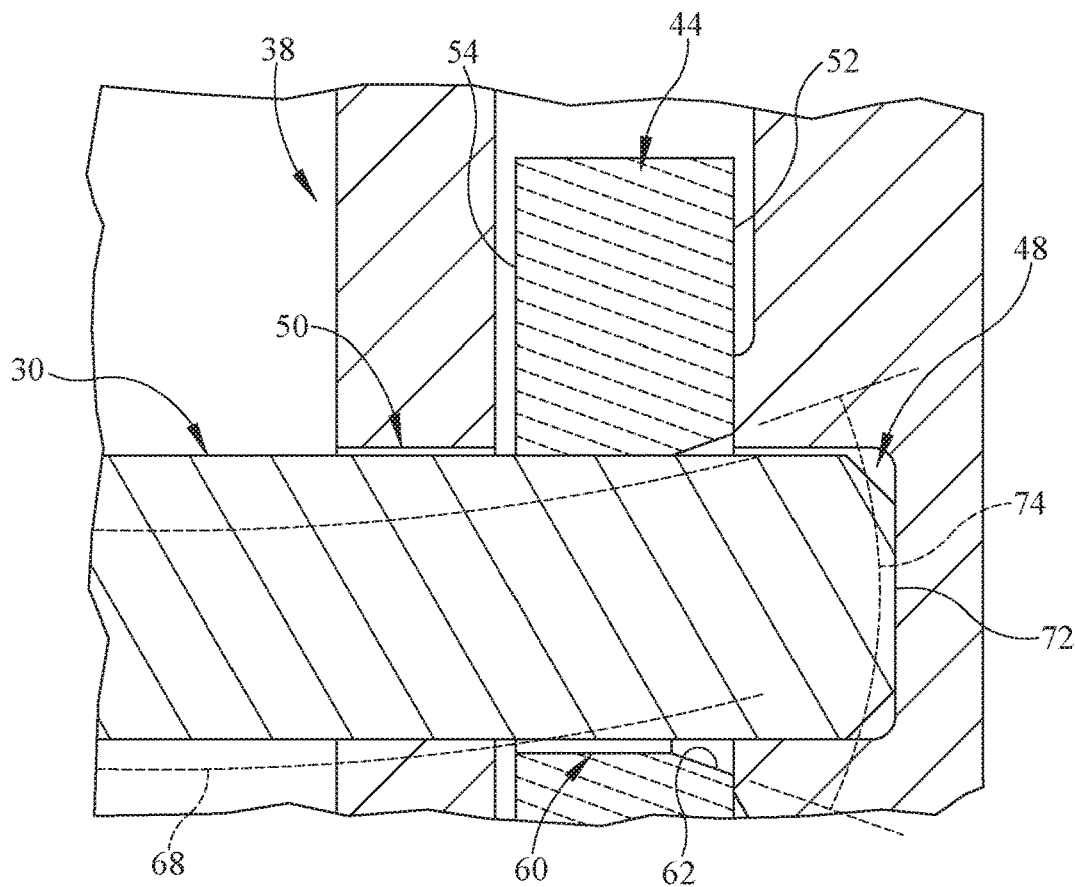
FIG. 4 is an enlarged sectional view of a portion of the turbine shroud assembly of FIG. 3 showing that one of the attachment flanges has a confronting face that faces toward the other attachment flange and an opposing face that faces away from the other attachment flange and is formed to include a countersink around the second pin passage to reduce stress induced in the blade track segment by bending of the mount pin.

The attachment flange 44 of the blade track segment 28 forms an opposing face 52 as shown in FIGS. 3 and 4. The opposing face 52 faces the support flange 36 of the carrier 26 when the pin passage 60 is aligned with the pin-receiving aperture 48.

The opposing face 52 is formed to include a countersink 62 as shown in FIGS. 2 and 3. The countersink 62 is formed around the pin passage 60. The countersink 62 is configured to reduce stress induced in the blade track segment 28 by bending of the mount pin 30. The bending of the mount pin 30 is suggested by the lines 68 as suggested in FIGS. 3 and 4.

During use of the turbine shroud assembly 22 in the gas turbine engine 10, loading of the blade track segment 28 radially inward causes the mount pin 30 to bend. The deflection of the mount pin 30 drives a line or point contact between the mount pin 30 and the attachment flange 44. The countersink 66 moves the contact between the mount pin 30 and the attachment flange 44 away from the opposing face 56. The resulting contact stresses are insensitive to variations in the alignment and deflection of the mount pin 30.

In the illustrative embodiment, the blade track segment 28 includes two attachment flanges, a fore attachment flange 42 and an aft attachment flange 44 as shown in FIGS. 2 and 3. The fore attachment flange 42 extends radially outward from the runner 40. The aft attachment flange 44 extends radially outward from the runner 40 at a location spaced axially from the fore attachment flange 42.

In the illustrative embodiment, the aft attachment flange 44 is spaced apart from the fore attachment flange 42 to establish the opposing face 52 and a confronting face 54 as shown in FIGS. 3 and 4. The confronting face 54 faces toward the fore attachment flange 42, while the opposing face 52 faces away from the fore attachment flange 42 toward the support flange 36 of the carrier 26. The opposing face 52 is shaped to include the countersink 62 in the illustrative embodiment.

In the illustrative embodiment, the carrier 26 includes a fore support flange 34, an aft support flange 36, and an intermediate support flange 38 as shown in FIGS. 2-4. Each of the fore support flange 34, the aft support flange 36, and the intermediate support flange 38 extend inwardly from the support panel 32 and engage the mount pin 30. The fore support flange 34 is arranged adjacent to the fore attachment flange 42 of the blade track segment 28. The aft support flange 36 and the intermediate support flange 38 are arranged adjacent to the aft attachment flange 36 of the blade track segment 28.

In the illustrative embodiment, the fore support flange 34 is located axially forward of the fore attachment flange 42 of the blade track segment 28, while the aft support flange 36 is located axially aft of the aft attachment flange 44 of the blade track segment 28 as shown in FIGS. 2-4. In this way, both the fore attachment flange 42 and the aft attachment flange 44 of the blade track segment 28 are located axially between the fore support flange 34 and the aft support flange 36.

The intermediate support flange 38 extends inward from the support panel 32 axially between the fore and aft support flanges 34, 36 as shown in FIGS. 2-4. The intermediate support flange 38 is spaced apart axially aft of the fore support flange 34 in confronting relation to the aft attachment flange 44 of the blade track segment 28 in the illustrative embodiment.

The fore support flange 34 is shaped to include a fore pin-receiving aperture 46 as shown in FIG. 3. The fore pin-receiving aperture 46 extends axially partway into the fore support flange 34.

The aft support flange 36 is shaped to include the aft pin-receiving aperture 48 as shown in FIGS. 3 and 4. The aft pin-receiving aperture 48 extends axially partway into the aft support flange 36.

The intermediate support flange 38 is shape to include an intermediate pin-receiving aperture 50 as shown in FIGS. 3 and 4. The intermediate pin-receiving aperture 50 extends axially through the intermediate support flange 38 in the illustrative embodiment.

In the illustrative embodiment, the fore attachment flange 43 has an opposing face 56 and a confronting face 58 as shown in FIG. 3. The confronting face 58 faces toward the aft attachment flange 44, while the opposing face 56 faces away from the aft attachment flange 44 toward the fore support flange 34 of the carrier 26.

The fore attachment flange 42 is formed to include a fore pin passage 64 as shown in FIG. 3. The fore pin passage 64 extends between the confronting face 58 and the opposing face 56 axially through the fore attachment flange 42. The fore pin passage 64 is aligned with the fore pin-receiving aperture 46 in the fore support flange 34 in the illustrative embodiment.

In the illustrative embodiment, the opposing face 56 of the fore attachment flange 42 is formed to include a countersink 66 as shown in FIG. 3. The countersink 66 is formed around the fore pin passage 64.

In the illustrative embodiment, the countersink 62 formed in the aft attachment flange 44 is has a predetermined angle 74 as shown in FIG. 4. In some embodiments, the predetermined angle is about 40 degrees. In other embodiments, the predetermined angle is less than 40 degrees.

In the illustrative embodiment, the countersink 66 formed in the fore attachment flange 42 also has a predetermined angle 74. The predetermined angle 74 is the same as the countersink 62 formed in the aft attachment flange 44. In other embodiments, the predetermined angles 74 of the counter sinks 62, 66 may be different from one another.

In the illustrative embodiment, the confronting face 54 of the aft attachment flange 44 faces the intermediate support flange 38 of the carrier 26, while the opposing face 52 faces toward the aft support flange 36 as shown in FIGS. 3 and 4. The aft attachment flange 44 is formed to include the aft pin passage 60 that extends between the confronting face 54 and the opposing face 52 axially through the aft attachment flange 44. The aft pin passage 60 is aligned with the aft pin-receiving aperture 48 in the aft support flange 36 in the illustrative embodiment.

The mount pin 30 extends from the carrier 26 through the fore pin passage 64 in the fore attachment flange 42 and the aft pin passage 60 in the aft attachment flange 44. In the illustrative embodiment, a first end 70 of the mount pin 30 is arranged in the fore pin-receiving aperture 46 and a second end 72 of the mount pin 30 is arranged in the aft pin-receiving aperture 48.

The ends 70, 72 of the mount pin 30 are arranged in the support flanges 34, 36 such that the body of the mount pin 30 supports the blade track segment 28 relative to the carrier 26. The blade track segment 28 causes the mount pin 30 to bend during use of the turbine shroud assembly 22 in the gas turbine engine 10.

In the illustrative embodiment, the aft and intermediate support flanges 36, 38 form a clevis feature around the aft attachment flange 44 as shown in FIGS. 3 and 4. The clevis feature helps prevent the mount pin 30 from bending, which in turn reduces the stress around the pin passages 60, 64 in the blade track segment 28.

Figure 5:
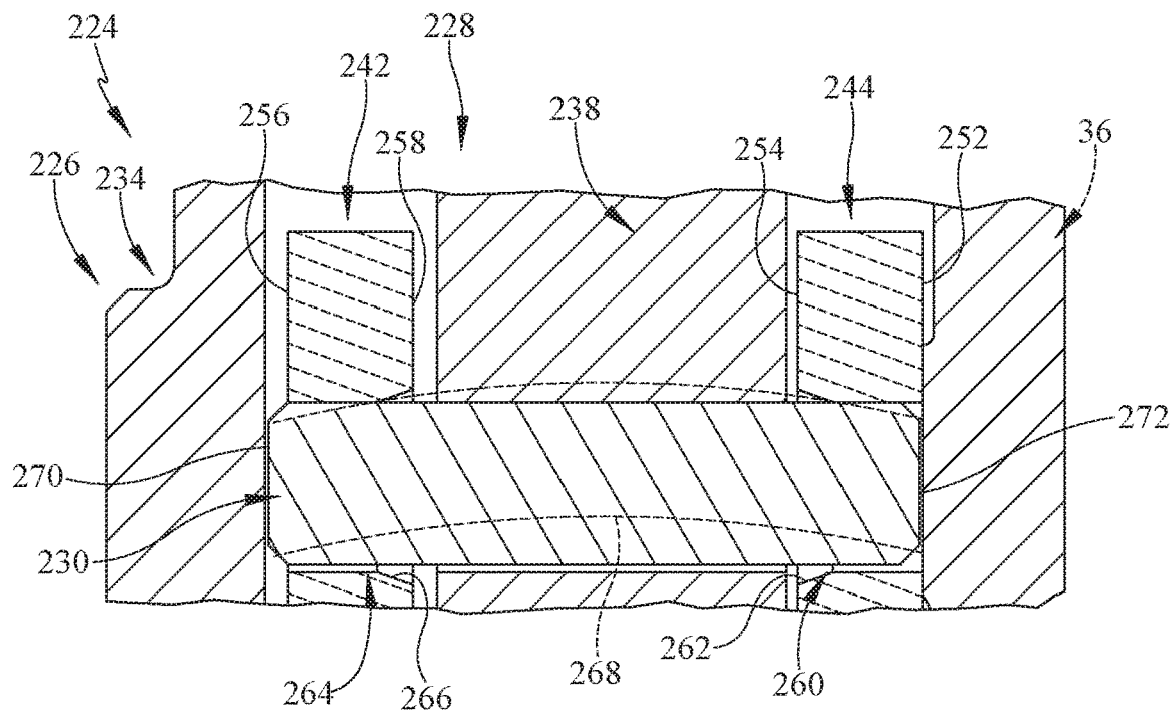
FIG. 5 is an enlarged section view of another embodiment of a turbine shroud assembly in accordance with the present disclosure including a carrier, a blade track segment, and a mount pin configured to couple the blade track segment with the carrier by extending axially through the blade track segment and a portion of the carrier axially between attachment flanges of the blade track segment to couple the blade track segment to the carrier.
Figure 6:
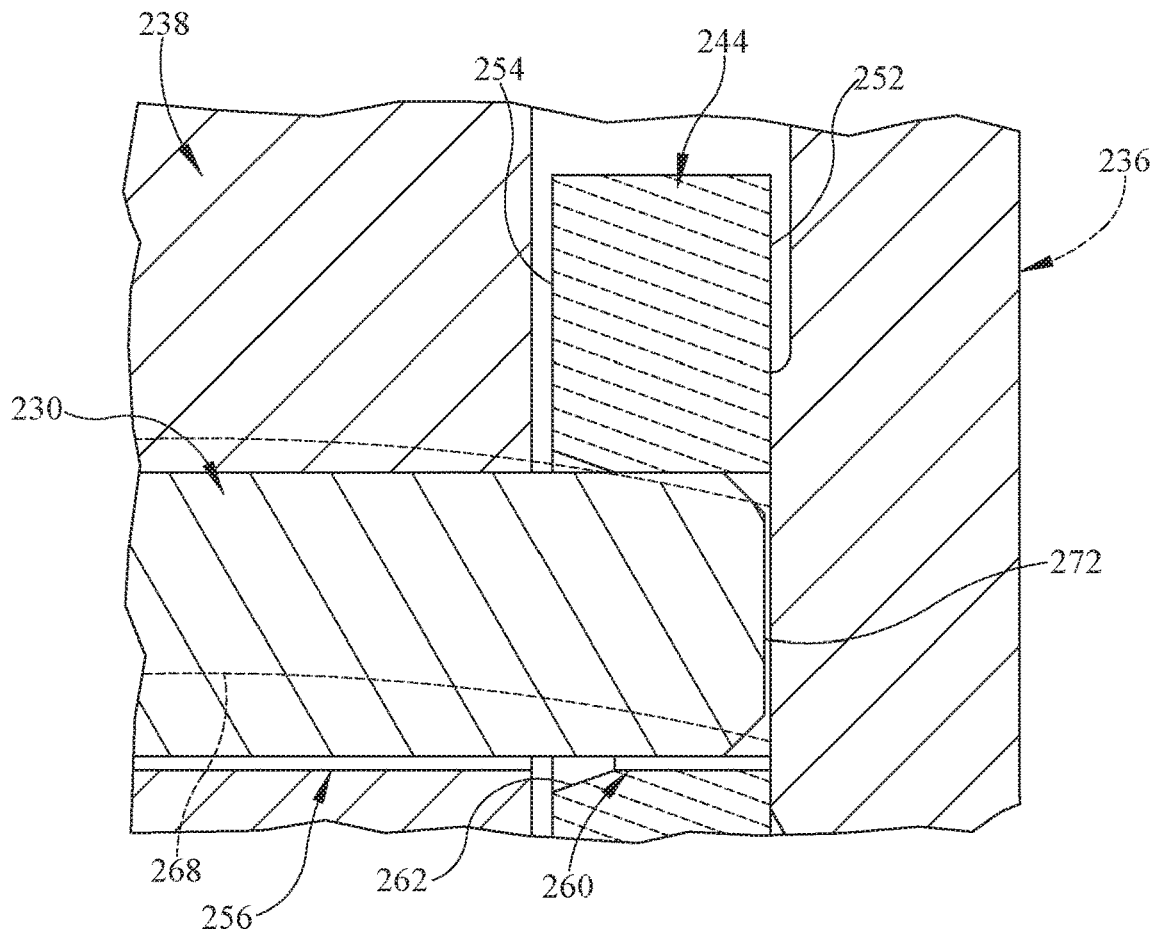
FIG. 6 is an enlarged sectional view of a portion of the turbine shroud assembly of FIG. 5 showing one of the attachment flanges of the blade track segment has an opposing face that faces away from the other attachment flange and a confronting face that faces toward the portion of the carrier and is formed to include a countersink around a pin passage formed in the attachment flange to reduce stress induced in the blade track segment by bending of the mount pin.

Another embodiment of a turbine shroud segment 224 in accordance with the present disclosure is shown in FIGS. 5 and 6. The turbine shroud segment 224 is substantially similar to the turbine shroud segment 24 shown in FIGS. 1-4 and described herein. Accordingly, similar reference numbers in the 200 series indicate features that are common between the turbine shroud segment 24 and the turbine shroud segment 224. The description of the turbine shroud segment 24 is incorporated by reference to apply to the turbine shroud segment 224, except in instances when it conflicts with the specific description and the drawings of the turbine shroud segment 224.

Each shroud segment 224 includes a carrier 226, a blade track segment 228, and a mount pin 230 as shown in FIGS. 5 and 6. The mount pin 230 is configured to couple the blade track segment 228 to the carrier 226 to position the blade track segment 228 in a predetermined location relative to the blades 13.

The carrier 226 includes a fore support flange 234, an aft support flange 236, and an intermediate support flange 238 as shown in FIGS. 5 and 6. Each of the fore support flange 234, the aft support flange 236, and the intermediate support flange 238 extend inwardly from a support panel, like the support panel 32 of the previous embodiment, and engage the mount pin 230. The aft support flange 236 is spaced apart axially from the fore support flange 234, while the intermediate flange 238 extends radially inward axially between the fore and aft support flanges 234, 236. In some embodiments, the intermediate support flange 238 may be a separate component that is coupled to the support panel.

The blade track segment 228 is positioned directly inward from the carrier 226 and includes a runner, the like runner 40 of the previous embodiment, a fore attachment flange 242, and an aft attachment flange 244 as shown in FIGS. 5 and 6. The fore and aft attachment flanges 242, 244 extend radially outward from the runner toward the carrier 226. The aft attachment flange 244 extends radially outward at a location spaced axially from the fore attachment flange 244.

In the illustrative embodiment, the fore support flange 234 is arranged adjacent to the fore attachment flange 242 of the blade track segment 228, while the aft support flange 36 is arranged adjacent to the aft attachment flange 244. The intermediate support flange 38 is arranged axially between the fore and aft attachment flanges 242, 244 as shown in FIG. 5.

In the illustrative embodiment, the fore support flange 234 is located axially forward of the fore attachment flange 242 of the blade track segment 228, while the aft support flange 236 is located axially aft of the aft attachment flange 244 of the blade track segment 28 as shown in FIG. 5. In this way, both the fore attachment flange 242 and the aft attachment flange 244 of the blade track segment 228 are located axially between the fore support flange 234 and the aft support flange 236.

In the illustrative embodiment, the fore and aft attachment flanges are both shaped to include a confronting face 254, 258 and an opposing face 252, 254 as shown in FIGS. 5 and 6. Each of the fore and aft attachment flanges 242, 244 is also shaped to include a pin passage 260, 264 that extend through the respective attachment flange 242, 244.

In the illustrative embodiment, the opposing face 256 of the fore attachment flange 242 faces the fore support flange 234 of the carrier 226, while the confronting face 258 faces toward the aft attachment flange 244 and is in confronting relation to the intermediate support flange 238. The fore pin passage 264 extends between the opposing face 256 and the confronting face 258 and aligns with an intermediate pin-receiving aperture 250 formed in the intermediate support flange 238.

In the illustrative embodiment, the opposing face 252 faces the aft support flange 236 of the carrier 226, while the confronting face 254 faces toward the fore attachment flange 42 and is in confronting relation to the intermediate support flange 238. The aft pin passage 260 extends between the opposing face 252 and the confronting face 254 and aligns with the intermediate pin-receiving aperture 250 formed in the intermediate support flange 238.

The mount pin 230 extends through the fore pin passage 264 in the fore attachment flange 242, the intermediate pin-receiving aperture 250 in the intermediate support flange 238, and the aft pin passage 60 in the aft attachment flange 44 as shown in FIG. 5. In the illustrative embodiment, a first end 270 of the mount pin 230 is in confronting relation to the fore support flange 234 and a second end 72 of the mount pin 30 is in confronting relation to the aft support flange 236.

The fore and aft support flanges 234, 236 block axial movement of the mount pin 230 relative to the carrier 226, while the intermediate support flange 238 supports the blade track segment 228 axially between the fore and aft support flanges 242, 244. During use of the turbine shroud segment 224 in the gas turbine engine 10, loading of the blade track segment 228 radially inward causes the mount pin 230 to bend as suggested by lines 268.

Unlike the embodiments of FIGS. 1-4, the intermediate support flange 238 supports the mount pin 230 at a center of the mount pin 230 away from the ends 270, 272. As a result, the deflection 268 of the mount pin 230 drives a line or point contact between the mount pin 230 and the attachment flanges 242, 244 near the confronting faces 254, 258.

To minimize stresses in the blade track segment 228 at the pin passages 260, 264, the both the fore and aft attachment flanges 242, 244 are formed to include a countersink 262, 266 as shown in FIGS. 5 and 6. Each countersink 262, 266 moves the contact between the mount pin 230 and the attachment flanges 242, 244 away from the confronting face 254 258. The resulting contact stresses are insensitive to variations in the alignment and deflection of the mount pin 330.

In the illustrative embodiment, the confronting face 258 of the fore attachment flange 242 includes a countersink 266 around the fore pin passage 264 as shown in FIG. 5. The confronting face 254 of the aft attachment flange 244 includes a countersink 262 around the aft pin passage 260 as shown in FIGS. 5 and 6.

In some embodiments, only the confronting face 258 of the fore attachment flange 242 includes the countersink 266. In other embodiments, only the confronting face 254 of the aft attachment flange 244 includes the countersink 262. In the illustrative embodiment, both the fore and aft attachment flanges 242, 244 include countersinks 262, 266.

The present disclosure relates to a method for supporting a ceramic matrix composite blade track segment 28, 228 to reduce the stresses in the ceramic matrix composite material. In the illustrative embodiment, the blade track segment 28, 228 is coupled to the carrier 26, 226 using the mount pin 30, 230 as shown in FIGS. 2-6. The mount pin 30 extends from the carrier 26 axially through the fore pin passage 64 in the fore attachment flange 42 and the aft pin passage 60 in the aft attachment flange 44 to couple the blade track segment 28 to the carrier 26 in the illustrative embodiment of FIGS. 2-4. The mount pin 230 extends axially through the fore pin passage 264 in the fore attachment flange 242, through the carrier flange 238 in the carrier 226, and the aft pin passage 260 in the aft attachment flange 244 to couple the blade track segment 228 to the carrier 226 in the illustrative embodiment of FIGS. 5 and 6.

The arrangement of the mount pin 30, 230 creates a high concentration stress contact at the interface with the ceramic matrix composite blade track segment 28, 228. The interface between the blade track segment 28, 228 and the mount pin 30, 230 creates a line or even a point contact. The interface between the blade track segment 28 and the mount pin 30 creates a line/point contact especially if the mount pin 30 does not have a symmetric loading at the two ends of the mount pin 30 arranged in the pin-receiving apertures 46, 48 formed in the carrier 26.

As such, the fore and aft attachment flanges 42, 44, 242, 244 are shaped to include countersinks 62, 66, 262, 266 on the opposing faces 52, 56, 252, 256 as shown in FIGS. 3-6. The countersinks 62, 66, 262, 266 are arranged around the corresponding pin passages 60, 64, 260, 264. The countersinks 62, 66, 262, 266 is configured to reduce stress induced in the blade track segment 28, 228 by bending (i.e. the lines 68, 268) of the mount pin 30, 230 upon loading of the blade track segment 28, 228 radially inward during use of the turbine shroud segments 24, 224 in the gas turbine engine 10.

The deflections 68, 268 of the mount pin 30, 230 drives the line or point contact between the mount pin 30, 230 and blade track segment 28, 228. By adding the countersinks 62, 66, 262, 266 to the opposing faces 52, 56, 252, 256 of the corresponding attachment flanges 42, 44, 242, 244. The countersinks 62, 66, 262, 266 moves that contact from the edge of the attachment flange 42, 44, 242, 244 to a location closer to the center of the attachment flange 42, 44, 242, 244. This also has the added benefit of reduced stresses in the blade track segment 28, 228. By doing this, the resulting contact stresses are insensitive to variations in the pin alignment/deflections.

In some embodiments, the blade track segment 28, 228 may also be referred to as a heat shield component 28, 228. The heat shield component 28, 228 includes the runner 40, or also referred to as the shield panel 40, and the attachment flanges 42, 44, 242, 244.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly adapted to extend around a turbine wheel mounted for rotation about a central reference axis, the turbine shroud assembly comprising
    a carrier segment made from metallic materials,
    a blade track segment made from ceramic matrix composite materials, the blade track segment shaped to include a runner that faces radially inward toward the central reference axis, a first attachment flange that extends radially outward from the runner, and a second attachment flange that extends radially outward from the runner at a location spaced axially from the first attachment flange to establish a confronting face that faces toward the first attachment flange and an opposing face that faces away from the first attachment flange, and
    a mount pin that extends from the carrier segment through a first pin passage formed through the first attachment flange and a second pin passage formed through the second attachment flange to couple the blade track segment to the carrier segment, the mount pin shaped to include a first terminal end, a second terminal end spaced apart axially from the first terminal end, and an outer surface that extends between the first and second terminal ends,
    wherein one of the confronting face and the opposing face of the second attachment flange is formed to include a countersink around the second pin passage configured to reduce stress induced in the blade track segment by bending of the mount pin upon loading of the blade track segment radially inward during use of the turbine shroud assembly in the gas turbine engine, and
    wherein the first and second terminal ends of the mount pin are each spaced apart axially from the countersink and a portion of the outer surface of the mount pin that is located in the second pin passage is spaced apart from the countersink.

2. The assembly of claim 1, wherein the first attachment flange has a confronting face that faces toward the second attachment flange and an opposing face that faces away from the second attachment flange, and one of the confronting face and the opposing face of the first attachment flange is formed to include a countersink around the first pin passage.

3. The assembly of claim 2, wherein the carrier segment includes a first carrier flange arranged adjacent to the first attachment flange of the blade track segment and a second carrier flange arranged adjacent to the second attachment flange of the blade track segment.

4. The assembly of claim 3, wherein each countersink is formed in the opposing face of the respective attachment flange of the blade track segment.

5. The assembly of claim 4, wherein the mount pin extends at least partway into the first carrier flange and into the second carrier flange.

6. The assembly of claim 5, wherein the first carrier flange is located axially forward of the first attachment flange of the blade track segment and the second carrier flange is located axially aft of the second attachment flange of the blade track segment so that both the first attachment flange and the second attachment flange are located axially between the first carrier flange and the second carrier flange.

7. The assembly of claim 2, wherein the carrier segment includes a carrier flange arranged axially between the first attachment flange and the second attachment flange of the blade track segment and each countersink is formed in the confronting face of the respective attachment flange.

8. The assembly of claim 7, wherein the mount pin extends through the first attachment flange of the blade track segment, the carrier flange of the carrier segment, and the second attachment flange of the blade track segment.

9. The assembly of claim 2, wherein the carrier segment includes a first carrier flange located axially forward of the first attachment flange of the blade track segment and a second carrier flange located axially aft of the second attachment flange of the blade track segment so that both the first attachment flange and the second attachment flange are located axially between the first carrier flange and the second carrier flange,
    wherein the first carrier flange is formed to include a first pin-receiving aperture and the second carrier flange is formed to include a second pin-receiving aperture, the first terminal end of the mount pin is located in the first pin-receiving aperture and the second terminal end of the mount pin is located in the pin-receiving aperture, and
    wherein each countersink is formed in the opposing face of the respective attachment flange of the blade track segment.

10. The assembly of claim 2, wherein the carrier segment includes a first carrier flange located axially forward of the first attachment flange of the blade track segment, a second carrier flange located axially aft of the second attachment flange of the blade track segment so that both the first attachment flange and the second attachment flange are located axially between the first carrier flange and the second carrier flange, and an intermediate carrier flange located axially between the first attachment flange and the second attachment flange,
    wherein the first carrier flange is located axially forward of the first terminal end of the mount pin, the second carrier flange is located axially aft of the second terminal end of the mount pin, and the first and second terminal ends are spaced apart axially from the first and second carrier flanges, and
    wherein each countersink is formed in the confronting face of the respective attachment flange of the blade track segment.

11. The assembly of claim 1, wherein the carrier segment includes a first carrier flange located axially forward of the second attachment flange of the blade track segment and a second carrier flange located axially aft of the second attachment flange of the blade track segment so that both the second attachment flange is located axially between the first carrier flange and the second carrier flange,
    wherein the countersink is formed in the confronting face of the second attachment flange of the blade track segment.

12. An assembly adapted for use in a gas turbine engine, the assembly comprising a carrier component made from metallic materials and arranged to extend at least partway around a central reference axis, a heat shield component made from ceramic matrix composite materials, the heat shield shaped to include a shield panel configured to face a primary gas path of the gas turbine engine, a first attachment flange that extends radially from the shield panel, and a second attachment flange that extends radially from the shield panel at a location spaced axially from the first attachment flange to establish a confronting face that faces toward the first attachment flange and an opposing face that faces away from the first attachment flange, and a mount pin that extends from the carrier component through a first pin passage formed through the first attachment flange and a second pin passage formed through the second attachment flange of the heat shield component to couple the heat shield component to the carrier component, the mount pin shaped to include a first terminal end and a second terminal end spaced apart axially from the first terminal end, wherein one of the confronting face and the opposing face of the second attachment flange is formed to include a countersink around the second pin passage configured to reduce stress induced in the heat shield component by bending of the mount pin upon loading of the heat shield component radially away from the carrier component, and wherein the first and second terminal ends of the mount pin are each spaced apart axially from the countersink.

13. The assembly of claim 12, wherein the first attachment flange has a confronting face that faces toward the second attachment flange and an opposing face that faces away from the second attachment flange, and wherein one of the confronting face and the opposing face of the first attachment flange is formed to include a countersink around the first pin passage configured to reduce stress induced in the heat shield component by bending of the mount pin upon loading of the heat shield component radially away from the carrier component.

14. The assembly of claim 13, wherein the carrier component includes a carrier flange arranged axially between the first attachment flange and the second attachment flange of the heat shield component and each countersink is formed in the confronting face of the respective attachment flange.

15. The assembly of claim 14, wherein the mount pin extends through the first attachment flange of the heat shield component, the carrier flange of the carrier component, and the second attachment flange of the heat shield component.

16. The assembly of claim 13, wherein the carrier component includes a first carrier flange arranged adjacent to the first attachment flange of the heat shield component and a second carrier flange arranged adjacent to the second attachment flange of the heat shield component.

17. The assembly of claim 16, wherein each countersink is formed in the opposing face of the respective attachment flange of the heat shield component.

18. The assembly of claim 17, wherein the mount pin extends at least partway into the first carrier flange and the second carrier flange.

19. The assembly of claim 18, wherein the first carrier flange is located axially forward of the first attachment flange of the heat shield component and the second carrier flange is located axially aft of the second attachment flange of the heat shield component so that both the first attachment flange and the second attachment flange are located axially between the first carrier flange and the second carrier flange.

20. The assembly of claim 12, wherein the mount pin is shaped include an outer surface that extends between the first and second terminal ends and a portion of the outer surface of the mount pin that is located in the second pin passage is spaced apart from the countersink.

* * * * *